United States Patent [19]
Wolff et al.

[11] Patent Number: 5,360,874
[45] Date of Patent: Nov. 1, 1994

[54] SINTERED FILM

[75] Inventors: Roland Wolff, Seelze; Axel Bruder, Burgwedel, both of Germany

[73] Assignee: J. H. Benecke AG, Hanover, Germany

[21] Appl. No.: 54,896

[22] Filed: Apr. 28, 1993

[30] Foreign Application Priority Data

Jun. 3, 1992 [DE] Germany .............................. 4218316

[51] Int. Cl.$^5$ ...................... C08L 23/16; C08L 23/14; C08L 33/08
[52] U.S. Cl. ..................................... 525/227; 525/88; 525/93; 525/934; 264/126
[58] Field of Search ........................... 525/227, 88, 93; 521/919; 264/125, 126

[56] References Cited

U.S. PATENT DOCUMENTS

| | | | |
|---|---|---|---|
| 4,031,179 | 6/1977 | Tatzel et al. | 521/919 |
| 4,312,918 | 1/1982 | Bostwick | 525/227 |
| 4,710,544 | 12/1987 | Wolfe, Jr. | 525/227 |
| 5,272,210 | 12/1993 | Galante | 525/227 |

FOREIGN PATENT DOCUMENTS 0243206 10/1987 European Pat. Off. .
0482778 4/1992 European Pat. Off. .

Primary Examiner—James J. Seidleck
Assistant Examiner—M. L. Warzel
Attorney, Agent, or Firm—Rogers & Wells

[57] ABSTRACT

A sintered film containing a copolymer and optionally other common additives is described. The film contains about 30 to 70 parts by weight of a propylene copolymer with a melt index MFI 230/2.16 of at least approximately 3 g./10 min. and about 70 to 30 parts by weight of an ethylene-ethyl acrylate copolymer with a melt index MFI 230/2.16 of at least approximately 3 g./10 min. and with a Vicat softening point of at least about 40. The ethylene-ethyl acrylate copolymer contains approximately 7 to 35 wt % of ethyl acrylate. This film exhibits advantageous properties, particularly a good Shore A hardness.

21 Claims, No Drawings

SINTERED FILM

BACKGROUND OF THE INVENTION

The invention concerns a sintered film containing a copolymer and optionally other common additives.

The use of the so-called powder-slush-molding method has been known for some time for the production of interior coverings of motor vehicles, particularly for the production of instrument panels. Sintered films which are produced according to this method using a PVC powder are known. The PVC powder is thereby sintered together and gelled. With this process, neither additional pressure nor additional shearing are used.

In the powder-slush-molding method, referred to hereafter as the "slush" method, the following processing steps are carried out successively: heating the tool, PVC powder filling and rotating of the tool, gelling of the PVC, and cooling and releasing from the mold. In comparison to deep-drawn films, the products formed according to the slush method have the advantage of more extensive freedom from stress and a more flexible conformation. Moreover, with the slush process, a designer has greater freedom in shaping. PVC materials, like the PVC sintered films described above, are being rejected more and more with regard to environmental protection. Therefore, in German Patent No. 39 16 874 [Offenlegungsschrift] sintered films based on polyurethane were proposed, which are used in particular to coat shaped parts in the interior space of motor vehicles. If aromatic thermoplastic polyurethanes (TPU), possibly thermoplastic polyurethanes, are used according to this known proposal, such sintered films are not satisfactory with respect to the light resistance requirement of the automobile industry. Sintered films made of high-molecular-weight polyethylene in particular are known from German Patent No. 29 22 152 [Offenlegungsschrift]. They did not always fulfill the requirements for, for example, the interior coverings of motor vehicles, particularly the instrument-panel area. Special requirements that can be mentioned here are the following: a Shore A hardness of approximately 70 to 90, fogging properties of less than 1 mg according to DIN 75 201/g. and of more than 85% according to DIN 75 201/r, and a resistance to light of more than LE 7 according to DIN 75 202. This list is not exhaustive.

The object of the present invention is to prepare a sintered film based on a thermoplastic polyolefin which can be produced according to the slush method without problems, which fulfills the requirements stated above, and which is satisfactory with respect to environmental protection.

SUMMARY OF THE INVENTION

The present invention provides a sintered film which contains about 30 to 70 parts by weight of a propylene copolymer with a melt index MFI 230/2.16 of at least approximately 3 g./10 min., according to DIN 53 735, and about 70 to 30 parts by weight of an ethylene-ethyl acrylate copolymer with a melt index MFI 230/2.16 of at least approximately 3 g./10 min., according to DIN 53 735, and a softening point corresponding to the Vicar number of at least 40, according to JIS K 6730, wherein the ethylene-ethyl acrylate copolymer contains approximately 7 to 35 by weight percentage of ethyl acrylate.

DESCRIPTION OF THE PREFERRED EMBODIMENTS

A propylene copolymer with a melt index MFI 230/2.16 of at least about 3 g./min., preferably at least about 10 g./min., and most preferably at least about 12 g./min., according to DIN 53 735, is used as the main component of the sintered film. Propylene homopolymers do not lead to the desired products for the method, since they exhibit an undesirable hardness and brittleness. Ethylene-propylene copolymers are particularly suitable, both for block copolymers and random copolymers. Random ethylene-propylene copolymers are preferred, since the sintered films produced with them exhibit a lower white fracture. The ethylene fraction in the propylene block copolymers is about 5 to 40%, most preferably about 7 to 25%, and in the random copolymers it is preferably about 0.1 to 7%, preferably 3 to 5%. The ethylene-propylene block copolymers exhibit a desirable, high impact resistance. The random propylene copolymers, on the other hand, have a lower degree of crystallinity. In connection with this, the finished parts exhibit a higher tenacity, higher transparency, and a broader melting temperature.

Within the scope of the invention, the various forms of ethylene-propylene-diene terpolymers (EPDM) can also be used as propylene copolymers—that is, in amorphous or partially crystalline molds. Here, it is a matter of using thermoelastic materials. Therefore, the materials also exhibit elastic properties, which can be advantageous in individual cases, in particular if a pronounced softness of the sintered film is required. Partially cross-linked ethylene-propylene rubbers can also be used. The ethylene-ethyl acrylate copolymer used is the "soft" component in the mixture under discussion.

The ethylene-ethyl acrylate copolymer has a melt index of at least about 3 g./10 min., preferably at least about 10 g./10 min. The degree of crystallinity is reduced by the introduction of the ethyl acrylate group into the polyethylene (PE) chain, which leads to a greater flexibility and a lower melt temperature. With an increased acrylate content, the polarity of the polymer also increases, which brings about greater intermolecular forces. A few physical properties can also be improved by increasing the molecular weight.

The propylene copolymer and the ethylene-ethyl acrylate copolymer should have good flow solely under the individually chosen sintering conditions. Moreover, they have the same minimum requirement regarding the melt index mentioned above. When the general conditions in accordance with the invention are maintained, they lead, in functional interaction, to the desired product with the required properties. Appropriately, the invention is thereby embodied in a such a way that the following mechanical properties are also taken into consideration:

a) elongation at tear, according to DIN 53 455, of more than about 200%;

b) tensile strength, according to DIN 53 455, of more than about 12 N/mm$^2$; and c) change in the elongation at tear to at least 66% and in the tensile strength to a maximum 110% of the initial value after a heat storage of 500 hours (h) at 120° C.

In the production of the sintered film according to the present invention, it has been shown that the temperatures used during the processing of PVC are also suitable here. This means that it is possible to work with the systems currently in use. Thus, at present, the temperature range is between about 210° and 230° C. The properties inherent in the propylene copolymer and the ethylene-ethyl acrylate copolymer used as starting materials have an effect on the properties of the finished sintered film in accordance with the present invention, as a function of the type of starting material and the mixing ratio.

Common additives can also be used in the present films. Release agents, such as polyethylene or polypropylene waxes, are particularly important. The release agent is preferably used in an amount of about 0.3 to 1.5 wt. % in the film. Other suitable additives are UV stabilizers, such as various low-molecular-weight and high-molecular-weight substituted resorcinols, salicylates, benzotriazoles, benzophenones and mixtures of the same and similar substances; and, in the commercially complicated compounds, poly[[6-[(1,1,3,3-tetramethylbutyl)amino]-1,3,5-triazine -2,4-di-yl][2,2,6,6-tetramethyl-4-piperidinyl)imino]-1,6-hexane-di-yl[(2,2,6,6-tetramethyl-4-piperidinyl)imino]] (as an antioxidant and light stabilizer), bis-2,2,6,6-tetramethyl-4-piperidyl sebacate (as a light stabilizer) and the phenol 2,4-bis(1,1-dimethylethyl)-phosphite (3:1) (as a light stabilizer), and fillers, particularly potassium aluminum silicate, talc, chalk, kaolin, and metal oxides, particularly titanium dioxide, and/or carbon black.

The invention will be explained in more detail in the following examples:

EXAMPLE 1

Recipe: (material used: 500 g.)

70 parts by weight of propylene copolymer (melt index 17 g./10 min.) with an ethylene content of approximately 4%.

30 parts by weight of ethylene-ethyl acrylate copolymer (EEA) (melt index 69 g./10 min.) with an ethyl acrylate (EA) content of 17%.

A mixture was compounded in a laboratory kneader in the usual manner. This compounded mixture was calendered on a Collin roll mill to produce a film having a thickness of 1 mm. This film was processed on a chopper to form particles with a length of approximately 5 mm. This was followed by a cold comminution in a laboratory turbo mill. The average particle size of the resulting powder was below 500 μm. This powder was processed in a laboratory slush unit at a temperature of 220° C. to form a film with a thickness of 1 mm in a period of 2½ min. The film obtained had the following properties: Shore A of hardness according to DIN 53 505 86.

EXAMPLE 2

Example 1 was repeated. The starting material, however, corresponded to the following recipe: 30 parts by weight of a propylene copolymer (melt index 17 g./10 min.) having an ethylene content of approximately 4% and 70 parts by weight of an ethylene-ethyl acrylate copolymer (EEA) (melt index 69 g./10 min.) having an EA content of 17%.

The properties of the resulting sintered film were as follows: Shore A of hardness according to DIN 53 505 74.

What is claimed is:

1. A sintered film which is prepared by a powder-slush-molding method from a thermoplastic polyolefin composition consisting essentially of (a) about 30 to 70 parts of a propylene copolymer having a melt index MFI 230/2.16 of at least about 3 g./10 min. and (b) about 70 to 30 parts of an ethylene-ethyl acrylate copolymer containing about 7–35 wt. % of ethyl acrylate and having a melt index MFI 230/2.16 of at least 3 g./10 min. and a softening point corresponding to a Vicat number of at least 40, the composition being suitable for preparing a sintered film by a powder-slush molding method.

2. A sintered film according to claim 1, wherein the propylene copolymer is a random copolymer.

3. A sintered film according to claim 2, wherein the random copolymer consists of ethylene and propylene.

4. A sintered film according to claim 3, wherein the ethylene fraction in the random copolymer is about 3 to 5 wt %.

5. A sintered film according to claim 1, wherein the melt index of the propylene copolymer is at least about 5 g/10 min.

6. A sintered film according to claim 1 wherein the melt index of the ethylene-ethyl acrylate copolymer is at least about 10 g/10 min.

7. A sintered film according to claim 1, further comprising a release agent.

8. A sintered film according to claim 7, wherein the release agent is a polyethylene or a polypropylene wax.

9. A sintered film according to claim 7, wherein the release agent in the film is present in an amount of about 0.3 to 1.5 wt %.

10. A sintered film according to claim 2, wherein the melt index of the propylene copolymer is at least about 5 g/10 min.

11. A sintered film according to claim 3, wherein the melt index of the propylene copolymer is at least about 5 g/10 min.

12. A sintered film according to claim 4, wherein the melt index of the propylene copolymer is at least about 5 g/10 min.

13. A sintered film according to claim 1, wherein the melt index of the propylene copolymer is at least about 12 g/10 min.

14. A sintered film according to claim 2, wherein the melt index of the propylene copolymer is at least about 12 g/10 min.

15. A sintered film according to claim 3, wherein the melt index of the propylene copolymer is at least about 12 g/10 min.

16. A sintered film according to claim 4, wherein the melt index of the propylene copolymer is at least about 12 g/10 min.

17. A sintered film according to claim 2, wherein the melt index of the ethylene-ethyl acrylate copolymer is at least about 10 g/10 min.

18. A sintered film according to claim 3, wherein the melt index of the ethylene-ethyl acrylate copolymer is at least about 10 g/10 min.

19. A sintered film according to claim 4, wherein the melt index of the ethylene-ethyl acrylate copolymer is at least about 10 g/10 min.

20. A sintered film according to claim 5, wherein the melt index of the ethylene-ethyl acrylate copolymer is at least about 10 g/10 min.

21. A sintered film according to claim 13, wherein the melt index of the ethylene-ethyl acrylate copolymer is at least about 10 g/10 min.

* * * * *